Sept. 11, 1962  A. J. GRANBERG  3,053,086
TURBINE TYPE METER

Filed Feb. 12, 1957  2 Sheets-Sheet 1

INVENTOR.
ALBERT J. GRANBERG
BY
Bruce & Brosler
ATTORNEYS

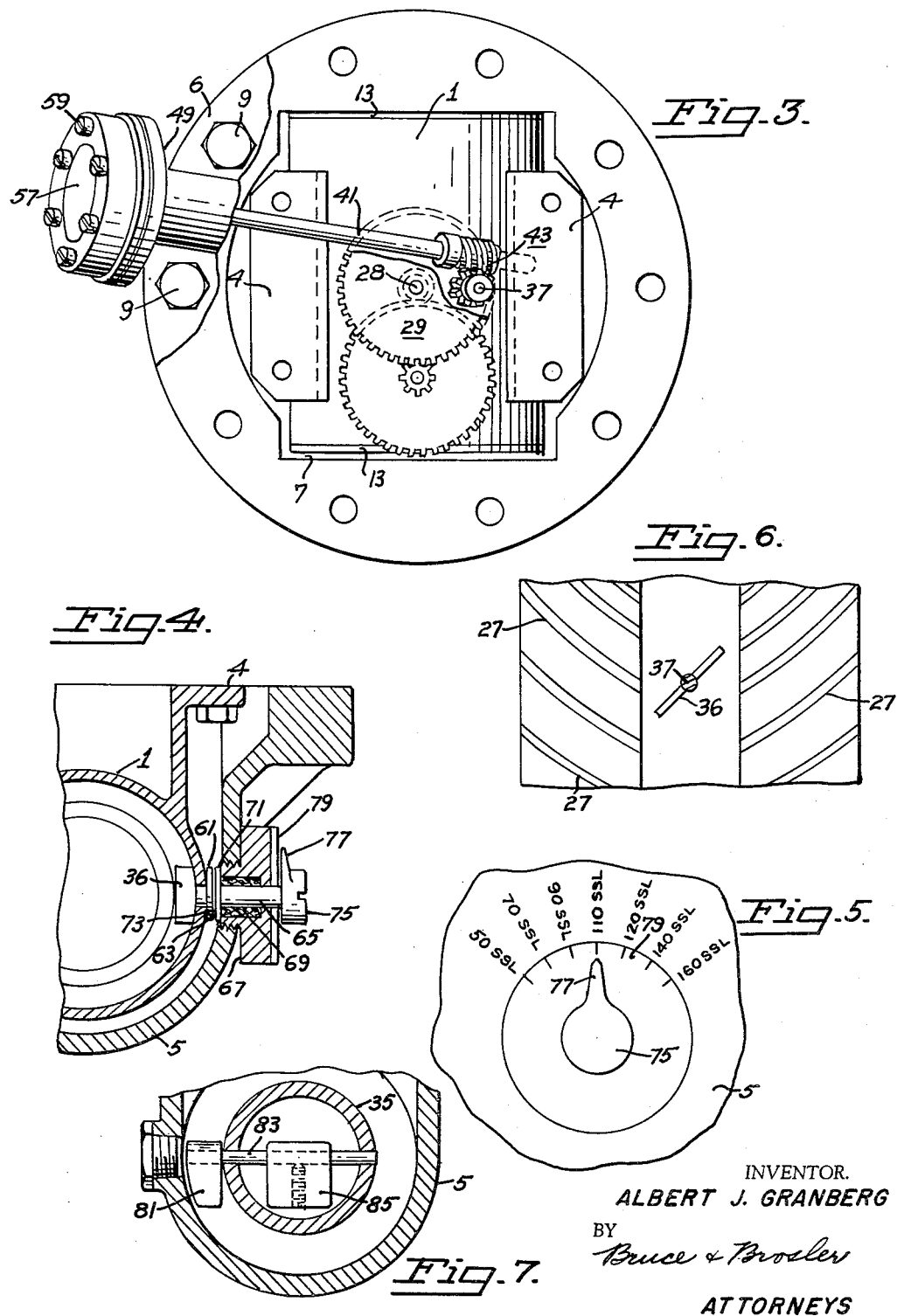

United States Patent Office 3,053,086
Patented Sept. 11, 1962

3,053,086
TURBINE TYPE METER
Albert J. Granberg, Oakland, Calif., assignor to Granberg Corporation, Oakland, Calif., a corporation of California
Filed Feb. 12, 1957, Ser. No. 639,820
11 Claims. (Cl. 73—230)

My invention relates to liquid meters and more particularly to meters of the turbine type.

The accuracy of liquid meters depends among other things, upon factors such as an accurate agreement between meter response and the resulting readings on an associated counter, the viscosity of liquid being metered, and velocity of liquid flow, particularly at the lower end of the measuring range of the meter where the volume handled is relatively low.

Among the objects of my invention are, (1) To provide a novel and improved liquid meter which may readily be adjusted for accuracy;

(2) To provide a novel and improved liquid meter wherein a plurality of adjustments may structurally be incorporated therein to provide for taking care of one or more of the aforementioned causes of inaccuracy in meters for measuring of liquids;

(3) To provide a novel and improved liquid meter possessing considerable flexibility in the matter of adjusting the same for accuracy;

(4) To provide a novel and improved liquid meter of the foregoing type which is well suited for pipe line installations, and when so used, may be readily removed for servicing and/or replacement without disturbing pipe line couplings:

(5) To provide a novel and improved liquid meter having an extended range of accuracy; and (6) To provide a novel and improved liquid meter for pipe line service, which may be calibrated at the factory and later installed in a pipe line without impairment of accuracy.

Additional objects of my invention will be brought out in the following description of a preferred embodiment of the same, taken in conjunction with the accompanying drawings, wherein, FIGURE 1 is a longitudinal view in section through a meter of the present invention;

FIGURE 3 is a plan view of the meter of FIGURE 1, with the cover for the most part broken away;

FIGURE 4 is a fragmentary view in section of a meter the type of FIGURE 1, illustrating a second embodiment of the present invention;

FIGURE 5 is a view of a calibration scale applicable to the form of the invention depicted in FIGURE 4;

FIGURE 6 is a fragmentary view of the rotor assembly of the preceding figures, depicting the relationship of an adjustment of the present invention, to the rotors in a turbine type meter; and FIGURE 7 is a fragmentary view in section, taken in the plane 7—7 of FIGURE 1.

Figure 1:
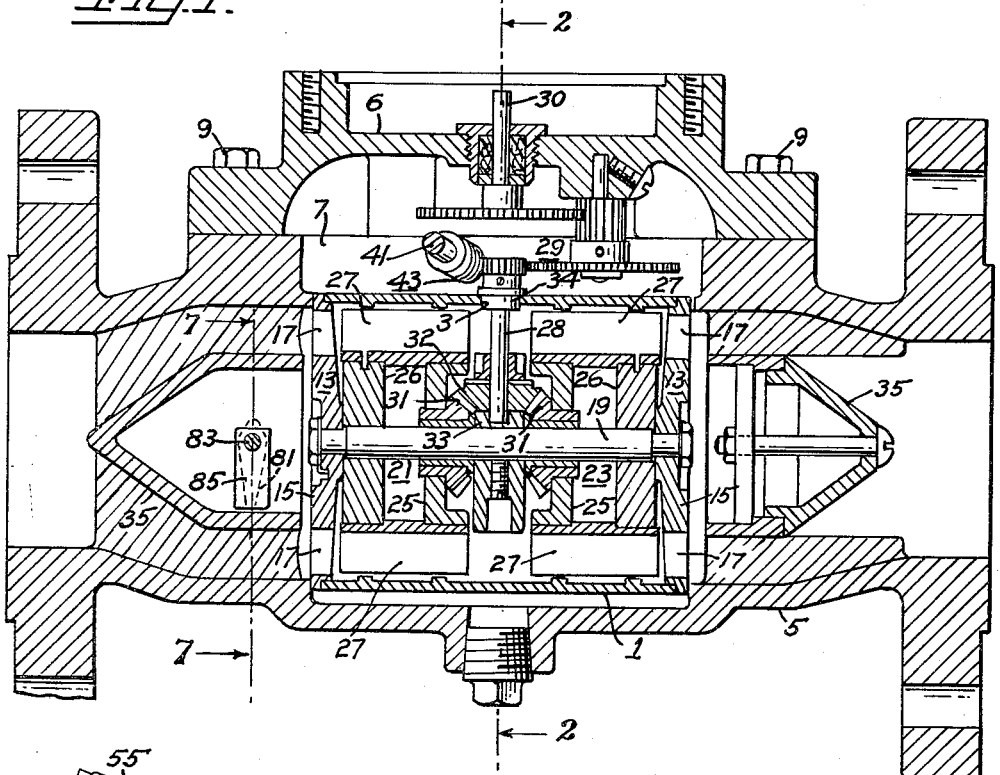
Figure 2:
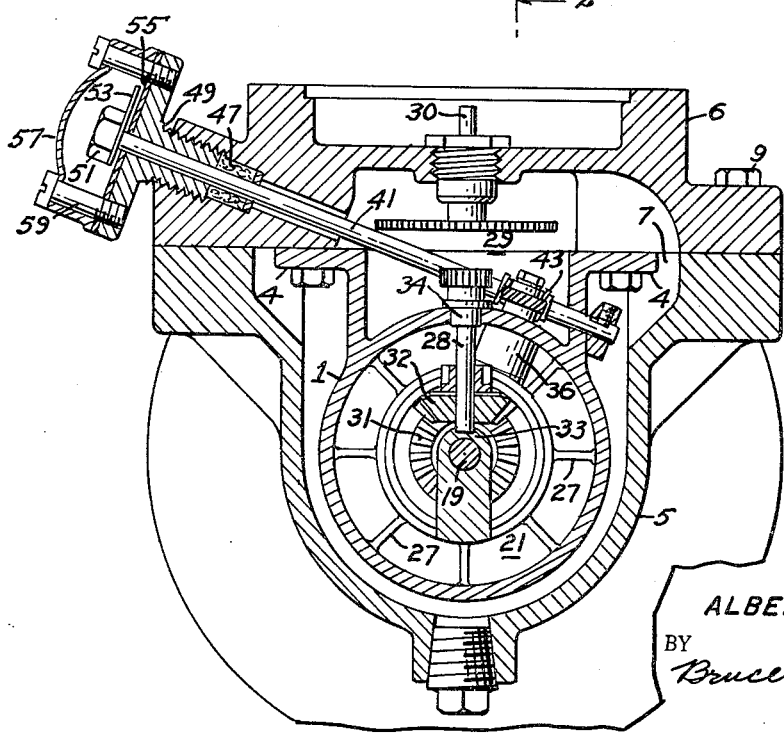
FIGURE 2 is a view in section taken in plane 2—2 of FIGURE 1.

Referring to the drawings for details of my invention, the same involves a meter of the turbine type, which in the form illustrated, comprises a cylindrical rotor housing 1 having a hole 3 intermediate the ends thereof, and a longitudinally positioned suspension flange 4 to either side of such hole. Such flanges permit suspension of the rotor housing in an end flanged section 5 of a pipe line, from a cover 6 adapted to span a meter opening 7 in such pipe section, to be bolted to such pipe section by bolts 9.

Within the housing there is disposed a dual rotor assembly including a spider 13 at each end of the rotor housing, in the form of a solid hub 15 and a bounding rim having a plurality of openings 17. A fixed shaft 19 is supported by the spiders along substantially the longitudinal axis of the housing, and a pair of rotors 21, 23 are rotatably mounted on this shaft.

Each of the foregoing mentioned rotors includes a two component rotor hub 25, 26 and a plurality of vane type blades 27 uniformly spaced about the rotor hub and anchored thereto, with each blade at an angle to the longitudinal axis of the hub and of a length to substantially span the distance between the lagging end of the blade ahead and the leading end of the blade behind, as viewed from one end of such rotor. Liquid flowing into such a rotor between such blades will cause rotation thereof on the supporting shaft, due to the angular disposition of the blades with respect to the approach of the liquid thereto.

The two rotors differ in the one respect, namely, that the blades of one are reversed with respect to the blades of the other, in order to produce rotation in opposite directions, in response to liquid flowing longitudinally through the housing.

Such rotational movement of both rotors is transformed into rotation of a common meter shaft 28, which in turn is coupled by suitable gear train 29 to a counter, the shaft 30 of which is shown, to record the quantity of liquid flowing through the meter.

To accomplish this, each of the rotors has, at its inner end, a bevel gear 31, each of which is in mesh with a miter gear 32 adjacent the lower end of the shaft 28. This shaft is journalled at its lower end in a bearing 33 suspended on the shaft 19, and at its upper end in a bearing 34 supported in the hole 3.

A hollow substantially conical flow guide 35 concentrically supported within the pipe section adjacent each end of the meter, serves to symmetrically distribute the liquid as it flows through the meter.

The meter thus described, functions due to the impact of the liquid against the blades, and inasmuch as the reverse rotation of the first rotor with respect to the other will naturally compensate for any lateral displacement of liquid in its passage through the first rotor, the liquid will pass completely through the meter with essentially no turbulence.

It is important to note further, that the passage through the meter is open at all times, and should the meter for any reason break down or fail to function, the liquid would still be free to flow through the line, and the flow will therefore, not be interrupted.

The present invention is based on the discovery that by changing the nature of the approach of the liquid to the blades of one or both rotors, the effect of the liquid flow upon the meter may be altered. By making such change in the form of a change in the angle of approach of the liquid to the blades of one or both rotors, the response of the meter may be increased or decreased, depending upon whether the angle of approach is increased or decreased, and that by introducing into such meter, structure which will permit of such changing of the angle of approach of the liquid to the blades of one or both rotors, the meter may thereby be adjusted to compensate for conditions which might otherwise render the meter inaccurate in its readings. I have found that to realize such results to an effective degree, only a small section of the flow need be directly acted upon.

Such structure for altering the angle of approach, in the preferred embodiment of the invention, may take the form of an adjustable baffle or vane 36 disposed in the flow path of the liquid through the meter. Such vane has an associated pivot shaft 37, which when passed through and journalled in the wall of the housing, will leave the vane supported in the path of the liquid through the meter as previously called for and the angular relationship of the vane to the blades of the rotor following, may be thereby altered. Preferably, the vane shaft passes through that portion of the housing intermediate the two rotors whereby the angle of approach of a portion of the liquid to the blades of the second rotor may be changed. The vane when thus located in the meter may be adjusted to cause the meter response to accurately register on the counter, or it may be adjusted to compensate for differences in viscosity of liquids to be metered.

Where adjustments for both conditions are contemplated, separate and independently controlled vanes will be installed in the meter. One such adjustment may be controlled from a position above the cover 6 of the meter, by adjusting means including an adjusting shaft 41 extending down through the cover at an angle to the pivot shaft of a suitably disposed vane, the adjusting shaft at its inner end being journalled in the proximate suspending flange wall and coupled to the vane shaft by a worm and pinion drive connection 43, which while it permits adjustment of the angular position of the vane, will at the same time prohibit disturbance of any prevailing angular adjustment of the vane, when impacted by the liquid flowing through the meter.

At its upper end, the adjusting shaft will pass through a packing gland 47 and a flanged bushing 49, and terminate in a control knob 51 carrying an associated pointer or indicator 53. A suitable scale 55 applied to the flange of the bushing may be employed in conjunction with the control knob and pointer to indicate adjustments.

This particular adjustment is admirably adapted for bringing the response characteristics of the meter to accurately register on the counter, and when once set, should be protected against tampering. Such protection is made possible by a cap 57 adapted to fit over and enclose the control knob 51, such cap being affixed to the flange of the bushing by suitable machine screws 59 or the like.

Adjustments for the second vane also may be made through the side wall of the pipe section in which the meter is installed. Adjusting means in this location must necessarily be such as to allow for the removal of the meter whenever desired. With this in mind, the pivot shaft of the vane, as it emerges externally of the wall of the housing, has affixed thereto a disk 61 provided with a peripheral notch 63. The adjusting shaft 65 passes through a flanged bushing 67 and packing gland 69 in the side wall of the pipe section, and on its inner end, carries a disk 71 having a crank pin 73 meshing with the notch of the opposing disk 61.

At its outer or exposed end, the adjusting shaft carries a suitable knob 75 and pointer 77 adapted to cooperate with a scale 79 applied to the flange of the bushing. If such control means is to provide for adjustments to compensate for variations in viscosity of the liquids being metered, the dial scale will be calibrated in terms of such viscosity.

The type of coupling just described will permit of any necessary adjustment of the vane associated therewith. At the same time, with the pin and notch at their lowermost points, the meter may be lifted in the vertical direction, thus making it possible to remove such meter whenever desired.

While the vane adjustments thus far described involve vanes disposed intermediate the two rotors of the meter, a vane may also be disposed in advance of the first rotor and in sufficient proximity thereto, to alter the approach of a portion of such liquid with respect to the blades of the first rotor, whereby to effect the rotational response of the meter to the liquid flow. A vane positioned at such location, can when properly controlled, be relied on to extend the range of accuracy of the meter toward the lower end of the scale.

All liquid meters are required by the Bureau of Standards regulations to measure within a certain specified accuracy over a range from full capacity to 20% of full capacity. Users of such meters however, in a great number of cases, demand an even greater range of accuracy than that specified. This I have made possible by fixing a vane 81 adjacent one edge thereof, on a shaft 83 passing through that conical shaped flow guide 35 located adjacent the entrance to the meter, whereby the vane will be caused to normally hang or be suspended from the shaft in the flow path of liquid to the meter. Within the conical flow guide a weight 85 is hung from and fixed to the shaft so as to offer resistance to angular displacement of the vane from its hanging or suspended position.

It will be appreciated that the vane will be angularly displaced to a degree depending on the rate of flow of liquid through the meter, and for full capacity flow, the weight can be such as to permit of the vane reaching substantially a horizontal position. During such displacement of the vane, that portion of liquid striking the same will be deflected, with the angle of deflection decreasing as the flow rate increases until at full capacity flow, substantially no deflection of the liquid occurs.

Conversely, as the flow rate decreases, the angle of deflection of liquid striking the vane increases. An increasing angle of deflection of the liquid causes the angle of approach of such liquid to the rotor blades to increase, thereby increasing the effective force against the rotors. Thus as the load on the meter drops toward the lower end of its normal range of accuracy, the increase in effective force of the liquid against the rotor will aid in overcoming the friction and drag in the meter and thereby extend the accuracy thereof at the lower readings.

From the foregoing description of my invention it becomes apparent that the same fulfills all the objects thereof, and while I have disclosed the same in considerable details, the invention is subject to alteration and modification without departing from the underlying principles involved, and I accordingly do not desire to be limited in my protection to the specific details illustrated and described, except as may be necessitated by the appended claims.

I claim:

1. A liquid meter comprising a rotor housing having a pair of turbine type rotors therein in spaced relationship to each other on a common axis along the flow path of liquid through said housing, means for registering resultant rotational movement of said rotors, and means for altering the response of said meter to liquid flow therethrough, said means including a stationary vane in the flow path of such liquid at a location between said rotors.

2. A liquid meter comprising a rotor housing having a pair of turbine type rotors therein in spaced relationship to each other on a common axis along the flow path of liquid through said housing, means for registering resultant rotational movement of said rotors, and means for altering the response of said meter to liquid flow therethrough, said means including a vane in the flow path of such liquid at a location between said rotors, and vane adjusting means extending from said vane through said housing to a point external of said meter.

3. A liquid meter for installation in a section of a pipe line having a meter opening therein, said meter comprising a substantially cylindrical rotor housing, a cover for such meter opening and having means on which to mount indicating mechanism, means for suspending said meter housing in such pipe section from said cover, a rotor assembly in said housing, said rotor assembly including a spider at each end, a shaft supported by said spiders along substantially the longitudinal axis of said housing, a plurality of turbine type rotors mounted on said shaft, each of said rotors including a rotor hub and a plurality of vane type blades spaced about said rotor hub and angularly disposed to the axis of said shaft, each of said spiders having a solid hub comparable in diameter to the hub of a rotor, and a bounding rim having openings for permitting liquid flow between the blades of said rotors to produce rotation thereof, means for registering rotational movement of said rotors, said means including a drive connection from said rotors and extending through said cover, and means for adjusting the response of said meter to liquid flow therethrough, said means comprising a vane means in the flow path of liquid through said meter, and means accessible from without the meter for changing the angular relationship of said vane means to said liquid flow to alter the angle of approach to said angular disposed vane type blades of the liquid striking said vane means.

4. A liquid meter for installation in a section of a pipe line having a meter opening therein, said meter comprising a substantially cylindrical rotor housing, a cover for such meter opening and having means on which to mount indicating mechanism, means for suspending said meter housing in such pipe section from said cover, a rotor assembly in said housing, said rotor assembly including a spider at each end, a shaft supported by said spiders along substantially the longitudinal axis of said housing, a plurality of rotors mounted on said shaft in longitudinally spaced relationship to each other, each of said rotors including a rotor hub and a plurality of vane type blades spaced about said rotor hub, each of said spiders having a hub comparable in diameter to the hub of a rotor, and a bounding rim having openings for permitting liquid flow between the blades of said rotors to produce rotation thereof, means for registering rotational movement of said rotors, said means including a drive connection from said rotors and extending through said cover, said drive connection including a shaft between said rotor assembly and said rotor housing in a radial direction, and means for adjusting the response of said meter to liquid flow therethrough, said means comprising a vane between said rotors in the flow path of liquid through said meter, and means accessible from without the meter for changing the relationship of said vane to said liquid flow to alter the direction of flow of such liquid as it reaches said vane, said means including a pivot shaft extending from said vane through said rotor housing on a radius defining an angle with said drive connection shaft, an adjusting shaft extending through said cover and terminating in proximity to said pivot shaft, and a worm and pinion drive connection coupling said adjusting shaft to said pivot shaft.

5. A liquid meter for installation in a section of a pipe line having a meter opening therein, said meter comprising a substantially cylindrical rotor housing having a hole intermediate the ends thereof, a cover for such meter opening having means on which to mount indicating mechanism, means for suspending said meter housing in such pipe section from said cover, a rotor assembly in said housing, said rotor assembly including a spider at each end, a shaft supported by said spiders along substantially the longitudinal axis of said housing, a plurality of rotors mounted on said shaft in longitudinally spaced relationship to each other, each of said rotors including a rotor hub and a plurality of vane type blades spaced about said rotor hub, each of said spiders having a solid hub comparable in diameter to the hub of a rotor, and a bounding rim having openings for permitting liquid flow between the blades of said rotors to produce rotation thereof, means for registering rotational movement of said rotors, said means including a drive connection from said rotors extending through the hole in said housing and through said cover, and means for adjusting the response of said meter to liquid flow therethrough, said means comprising a vane between said rotors in the flow path of liquid through said meter and having a pivot shaft passing through a wall of said housing, and means accessible from without the meter and coupled to said pivot shaft for changing the relationship of said vane to said liquid flow to alter the direction of flow of such liquid as it reaches said vane.

6. A liquid meter for installation in a section of a pipe line having a meter opening therein, said meter comprising a substantially cylindrical rotor housing having a hole intermediate the ends thereof, a cover for such meter opening having means on which to mount indicating mechanism, flange means for suspending said meter housing in such pipe section from said cover, a rotor assembly in said housing, said rotor assembly including a spider at each end, a shaft supported by said spiders along substantially the longitudinal axis of said housing, a plurality of rotors mounted on said shaft in longitudinally spaced relationship to each other, each of said rotors including a rotor hub and a plurality of vane type blades uniformly spaced about said rotor hub with each blade at an angle to the longitudinal axis of said hub and of a length to substantially span the distance between the lagging end of the blade ahead and the leading end of the blade behind as viewed from an end of said rotor, each of said spiders having a solid hub comparable in diameter to the hub of a rotor, and a bounding rim having openings for permitting liquid flow between the blades of said rotors to produce rotation thereof, means for registering rotational movement of said rotors, said means including a drive connection from said rotors extending through the hole in said housing and through said cover, and means for adjusting the response of said meter to liquid flow therethrough, said means comprising a vane between said rotors in the flow path of liquid through said meter and having a stem passing through a wall of said housing, and means accessible from without the meter for changing the relationship of said vane to said liquid flow to alter the direction of flow of such liquid as it reaches said vane, said last means including an adjusting shaft extending through said cover and having a worm and pinion connection to said vane stem externally of said housing.

7. A liquid meter for installation in a section of a pipe line having a meter opening therein, said meter comprising a substantially cylindrical rotor housing having a hole intermediate the ends thereof, a cover for such meter opening having means on which to mount indicating mechanism, means for suspending said meter housing in such pipe section from said cover, a rotor assembly in said housing, said rotor assembly including a spider at each end, a shaft supported by said spiders along substantially the longitudinal axis of said housing, a plurality of rotors mounted on said shaft in longitudinally spaced relationship to each other, each of said rotors including a rotor hub and a plurality of vane type blades uniformly spaced about said rotor hub with each blade at an angle to the longitudinal axis of said hub and of a length to substantially span the distance between the lagging end of the blade ahead and the leading end of the blade behind as viewed from an end of said rotor, each of said spiders having a solid hub comparable in diameter to the hub of a rotor, and a bounding rim having openings for permitting liquid flow between the blades of said rotors to produce rotation thereof, means for registering rotational movement of said rotors, said means including a drive connection from said rotors extending through the hole in said housing and through said cover, and means for adjusting the response of said meter to liquid flow therethrough, said means comprising a vane between said rotors in the flow path of liquid through said meter and having a stem passing through a wall of said housing, and means accessible from without the meter for changing the relationship of said vane to said liquid flow to alter the direction of flow of such liquid as it reaches said vane, said last means including a disk on the stem of said vane and having a slot in the periphery thereof, a control knob having an adjusting shaft passing through the wall of said pipe section from the outside and in substantial alignment with said vane stem, and a pin carried by the inner end of said adjusting shaft and adapted to enter the slot of said disk to provide a disconnectible control connection between said knob and said vane.

8. A liquid meter comprising a rotor housing having a rotor in the flow path of liquid through said housing, means for registering resultant rotational movement of said rotor in response to such flow of liquid, and means for increasing the relative response of said meter to such flow as the flow rate drops from full capacity flow toward the lower end of its capacity range, said means including a vane swingably supported in the flow path of liquid to and adjacent said rotor, said vane having an area substantially less than the cross section of said flow path, and means releasably resisting displacement of said vane from ts normal no-flow position, with increase in velocity of said liquid flow.

9. A liquid meter for installation in a pipe section of a pipe line and having a meter opening therein, said meter comprising a rotor housing, a cover for such meter opening and having means on which to mount indicating mechanism, means for suspending said meter housing in such pipe section from said cover, a rotor assembly in said housing, said rotor assembly including a spider at each end, a shaft supported by said spiders along substantially the longitudinal axis of said housing, a plurality of rotors mounted on said shaft, in spaced relationship to each other, each of said rotors including a rotor hub and a plurality of vane type blades uniformly spaced about said rotor hub, means for registering rotational movement of said rotors, said means including a drive connection from said rotors extending through said cover, and means for automatically increasing the angle of approach of liquid flow to the vanes of said rotors as the flow rate through said meter drops from its full load capacity toward the lower end of its capacity range, said means including a hollow substantially conical flow guide adjacent an end of said rotor assembly to define a flow path to said rotor assembly, a shaft passing diametrically through and journalled in said conical flow guide, a vane fixed to said shaft in the flow path to said rotor assembly, and a weight suspended from said shaft within said conical flow guide.

10. A liquid meter for installation in a pipe section of a pipe line and having a meter opening therein, said meter comprising a rotor housing, a cover for such meter opening and having means on which to mount indicating mechanism, means for suspending said meter housing in such pipe section from said cover, a rotor assembly in said housing, said rotor assembly including a spider at each end, a shaft supported by said spiders along substantially the longitudinal axis of said housing, a plurality of rotors mounted on said shaft, each of said rotors including a rotor hub and a plurality of vane type blades spaced about said rotor hub with each blade at an angle to the longitudinal axis of said hub, each of said spiders having a solid hub comparable in diameter to the hub of a rotor, and a bounding rim having openings for permitting liquid flow between the blades of said rotors to produce rotation thereof, means for registering rotational movement of said rotors, said means including a drive connection from said rotors extending through said cover, and means for increasing the relative response of said meter to liquid flow therethrough as the flow rate drops from full capacity flow toward the lower end of its capacity range, said means including a normally vertically disposed vane in the flow path of liquid to and adjacent said rotors, said vane having an area substantially less than the cross section of said flow path, and a weight connected thereto and resisting displacement of said vane from its normally vertical position.

11. A liquid meter of the turbine type comprising a rotor housing having an intake opening and a discharge opening to permit of flow of liquid therethrough; a rotor assembly rotatably supported in said housing on an axis substantially coinciding with the flow path of liquid through said housing, said rotor assembly including a rotor having a hub and a plurality of vane type blades affixed to said hub about the periphery thereof, said blades being angularly disposed to the axis of said rotor; a hollow substantially conical shaped flow guide in said housing adjacent the entrance to said rotor in spaced relationship to the interior surface of said housing to guide the flow of liquid into said rotor; and means connected to said flow guide and responsive to changes in rate of flow of liquid thereby for altering the angle of approach of a portion only of said liquid to said angularly disposed blades, said velocity responsive means including a vane supported for angular rotation between said flow guide and the interior surface of said housing.

References Cited in the file of this patent

UNITED STATES PATENTS

| | | | |
|---|---|---|---|
| 138,697 | Rouse | | May 6, 1873 |
| 166,175 | Winzer et al. | | July 27, 1875 |
| 197,949 | Swartz | | Dec. 11, 1877 |
| 354,614 | Tylor | | Dec. 21, 1886 |
| 629,834 | Webb | | Aug. 1, 1899 |
| 693,807 | Schmitz | | Feb. 18, 1902 |
| 2,305,311 | Jendrassik | | Dec. 15, 1942 |
| 2,800,022 | Granberg | | July 23, 1957 |
| 2,857,761 | Bodge | | Oct. 28, 1958 |
| 2,896,084 | McDonald | | July 21, 1959 |

FOREIGN PATENTS

| | | | |
|---|---|---|---|
| 478,001 | Germany | | June 26, 1929 |
| 453,752 | Great Britain | | Sept. 17, 1936 |